United States Patent Office 3,448,170
Patented June 3, 1969

3,448,170
PROCESS FOR THE PREPARATION OF POLYMERS BY REACTING GLYCINE DERIVATIVES AND POLYISOCYANATES
Rudolf Merten, Leverkusen, and Wilfried Zecher, Cologne-Stammheim, Germany, assignors to Farbenfabriken Bayer Aktiengesellschaft, Leverkusen, Germany, a corporation of Germany
No Drawing. Filed Feb. 23, 1967, Ser. No. 617,858
Claims priority, application Germany, June 18, 1966, F 49,504
Int. Cl. C08g 20/32, 41/00
U.S. Cl. 260—858
13 Claims

ABSTRACT OF THE DISCLOSURE

Heat resistant polymer may be prepared by heating glycine derivatives and polyisocyanates or polythioisocyanates to temperatures between 80° C. and 500° C. In an example 307 pts. of 1,4-bis-(alpha-methylamino-carbethoxymethyl)-benzene is condensed with 236 pts. of bis-(4-isocyanato-phenyl)-ether at 200° C. for 12 hours.

---

Heat resistant polymers obtained by reacting polyfunctional glycine derivatives and polyisocyanates or polyisothiocyanates at temperatures between 80 and 500° C., optionally in the presence of a catalyst or in an organic solvent.

It is already known that polyisocyanates and polyisothiocyanates can be reacted with compounds containing primary or secondary amino groups to form polyureas. Such polyureas have, however, only limited thermal stability owing to the urea or thiourea bonds being broken at elevated temperatures to yield low molecular weight decomposition products.

It is an object of this invention to produce novel heat resistant polymers. Other objects are these heat resistant polymers. Generally speaking these novel polymers are reaction products of polyisocyanates and polyfunctional glycine derivatives. As will become apparent the novel polymers are heat resistant synthetic resins, which may be used for all purposes where plastics are useful.

It has now been found that novel heat resistant polymers are obtained when polyfunctional glycine derivatives and polyisocyanates or polyisothiocyanates are heated to temperatures between 80 and 500° C., optionally in an organic solvent. Glycine derivatives within the scope of the present invention are compounds of the following formula

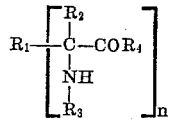

in which $R_1$ denotes an n-functional alkyl-, cycloalkyl-, alkoxyalkyl or alkylthioalkyl radical or an aralkyl or aryl radical, in which radicals there are at least three atoms in between any two links to the central C atom, $R_2$ denotes a hydrogen atom or an alkyl radical, $R_3$ denotes a hydrogen atom or an alkyl, aralkyl or aryl radical, $R_4$ denotes a hydroxyl, amino, alkylamino, dialkylamino, alkoxy or aroxy group and $n$ is an integer from 2 to 4.

If $R_1$ is an alkyl radical, this radical is preferably a branched or unbranched alkyl radical containing 3 to 18 carbon atoms, those groups with 3 to 6 carbon atoms being most particularly preferred, if radicals $R_2$ to $R_4$ represent derived from benzene, naphthalene or diphenyl.

The radicals $R_1$ are preferably derived from propane, dodecane, isopentane, diethylether, dipropylsulphide, benzene, azobenzene, naphthalene, diphenyl, disphenylmethane, diphenyl-ether, toluene, o-, m- or p-xylene, diethylnaphthalene, 4,4'-dimethyldiphenyl ether or tris-tolylmethane. These radicals may also carry one or more substituents, e.g. alkyl, halogen, nitro, alkoxy, dialkylamino, acyl, carbalkoxy or cyano groups.

Radicals $R_2$ to $R_4$ are preferably radicals within the preferred definition of alkyl, aralkyl and aryl as given above, alkyl and aryl radicals or the alkoxy, aroxy, alkylamino and dialkylamino radicals also conforming to this definition.

The glycine derivatives used as starting material for the process according to the invention may be prepared by known methods, e.g. by direct reaction of α-halogen polycarboxylic acids or their derivatives with ammonia or primary aliphatic or aromatic amines. A suitable carboxylic acid for use as starting product is, for example, phenylene-(1,4)-bis-[α-chloroacetic acid].

In another method polyfunctional aldehydes are condensed with hydrocyanic acid and suitable amines by the Strecker synthesis. The nitriles thereby obtained may then be saponified in known manner to carboxylic acids or converted directly into esters by means of alcohol/HCl.

The following compounds are examples of polyfunctional glycine derivatives which may be used as starting materials for the process according to the invention:

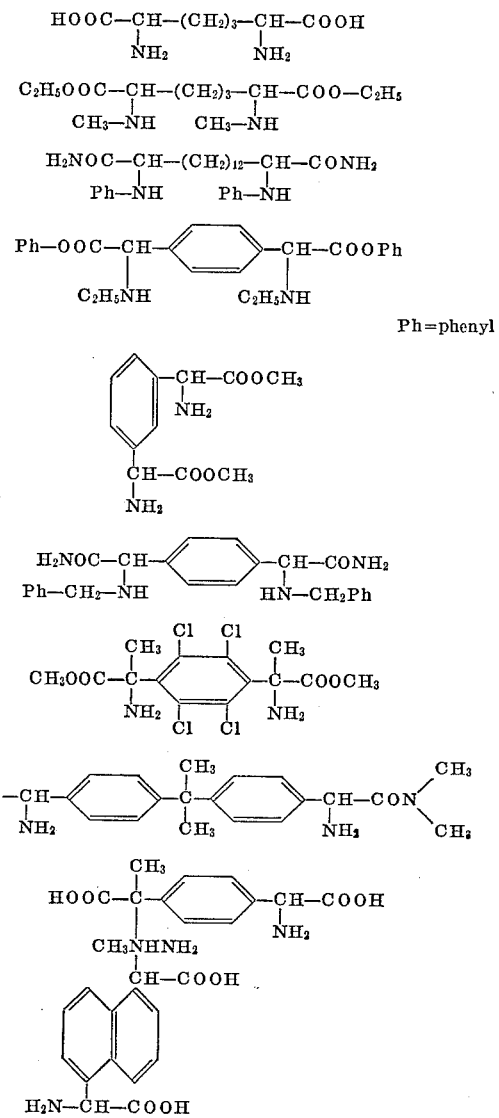

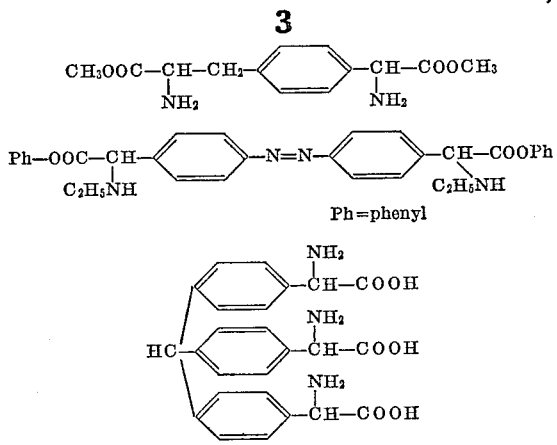

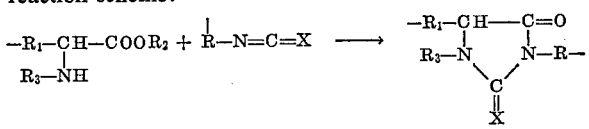

Suitable polyisocyanates and polyisothiocyanates are, for example, aliphatic, cycloaliphatic and aromatic compounds containing at least two NCO or NCS groups in the molecule. Examples of such polyisocyanates are polymethylene diisocyanates $OCN-(CH_2)_n-NCO$ where $n=4$ to 8, benzene diisocyanates which may, if desired, be substituted, such as m- and p-phenylene diisocyanates, toluylene-2,4- and -2,6-diisocyanate, ethylbenzene diisocyanates, di- and triisopropylbenzene diisocyanates, chloro-p-phenylene diisocyanates, diphenylmethane diisocyanates, naphthylene diisocyanates, ester isocyanates such as triisocyanato-arylphosphoric (thio)esters or ethylene glycol-di-p-isocyanatophenyl esters. Partially polymerized isocyanates having isocyanurate rings and free NCO groups may also be used.

The polyisocyanates may also be used in the form of their labile derivatives, e.g. the reaction products with phenols, alcohols, amines, ammonia, bisulphite, HCl etc. Specific examples of these masking agents are phenol, cresols, xylenol, ethanol, methanol, propanol, isopropanol, ammonia, methylamine, ethanolamine, dimethylamine, aniline and diphenylamine. Higher molecular weight adducts, e.g. of polyisocyanates with polyhydric alcohols such as ethylene glycol, propylene glycol, trimethylolalkanes or glycerol may also be used.

Instead of the polyisocyanates mentioned above, one may also use their thioanalogues in an analogous manner.

The process is generally carried out by prolonged heating of the two starting components in an organic solvent in which the resulting polymer remains in solution. The polymer can then be isolated by distilling off the solvent. The quantities of starting materials may be so chosen that 0.5 to 10 mols, and preferably 1 to 3 mols, of isocyanate or isothiocyanate groups are available per mol of NH group of the glycine derivative. Suitable solvents for use in the process are compounds which are inert to NCO groups, e.g. aromatic hydrocarbons, chlorinated aromatic hydrocarbons, aliphatic hydrocarbons, chlorinated aliphatic hydrocarbons, esters and ketones.

Especially suitable solvents are N-alkylpyrrolidones, dimethylsulphoxide, phenol, cresol and dimethylformamide. Where isocyanate or isothiocyanate derivatives are used, other solvents such as alcohols or phenols are also suitable. Alternatively the components may be reacted together in the melt.

The reaction times are between 30 minutes and 20 hours and in special cases may even extend beyond these limits. The reaction temperatures are between 80 and 500° C., depending on the starting material. One should preferably work at temperatures of 100 to 350° C., best results being obtained in the region of 140 to 280° C.

These condensation reactions can be accelerated by the use of catalysts such as metal alcoholates or tertiary amines.

In the polymerisation reaction according to the invention, a ring closure reaction takes place to form a hydantoin ring, in addition to the condensation of the two reactants. The ring closure is illustrated by the following reaction scheme:

in which R is the radical of the organic polyisocyanate. The other radicals have the meanings already indicated. The structure given in the formula represents the recurrent unit of the resulting polymer. The polymer itself may thus be regarded as a high molecular compound composed of these units.

Other polymeric compounds, such as polyesters, polyimides, polyurethanes, polyolefines, polyacetals, polyepoxides, polyamides, polyamideimides, polyimino polyesters or polyimide isocyanates, may also be added to the process of the invention.

Such materials can be mixed with the finished polymers of the present invention or they may be incorporated during formation of the polymer.

A special feature of the process according to the invention comprises the use of polyesters containing hydroxyl groups and excess quantities of iso(thio)cyanates components, which leads to the formation of a combination of (thio)hydantoin and urethane groups. For this purpose one may e.g. convert mixtures of the polyhydroxy compound, polyiso(thio)cyanate (derivative) and polyglycine derivative, if desired after prior condensation of two of these components, into the synthetic resin in a simultaneous final working step. (The additives in parentheses indicate alternative compound.)

The hydroxyl group-containing polyesters used are the known types which may be obtained, for example, by the usual methods from polycarboxylic acids such as succinic, adipic, sebacic, phthalic, isophthalic, terephthalic or oleic acid and polyhydric alcohols such as ethylene glycol, diethylene glycol, triethylene glycol, propylene glycol, dipropylene glycol, glycerol, trimethylol propane and pentaerythritol.

The polymers obtained by the process of the invention are heat resistant synthetic resins which remain stable up to about 350° C. and have excellent mechanical properties. Their molecular weight is in the range of 5000 to 250,000, preferably 1000 to 100,000. They may contain the usual additives for synthetic resins, such as fillers, pigments, antioxidants and plasticisers.

EXAMPLE 1

307 parts by weight of 1,4-bis-[α-methylamino-carbethoxymethyl]-benzene are introduced at 150° C. into a mixture of 1000 parts by weight of cresol and 236 parts by weight of bis-[4-isocyanato-phenyl]-ether and then condensed at 200° C. for 12 hours.

After evaporation of the solvent and heating to 240° C., a high melting polycondensate is obtained which shows the typical bands for hydantoins in the IR spectrum.

Instead of cresol, one may also use phenol, dimethyl acetamide, dimethylformamide or N-methylpyrrolidone as solvent.

EXAMPLES 2–5

The following components are converted into polyhydantoine by procedures analogous to those of Example 1.

No. 2
250 parts by weight

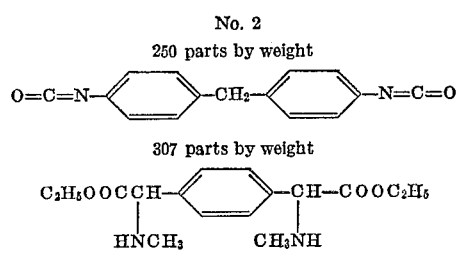

307 parts by weight

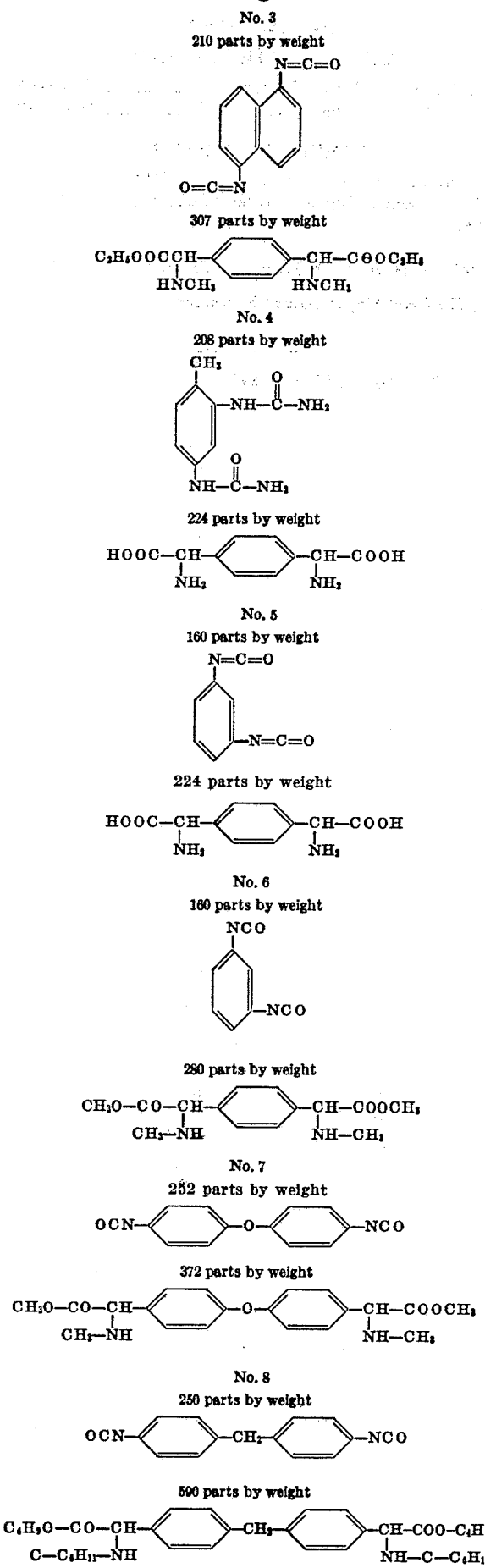

We claim:
1. A temperature resistant high molecular weight polymer having the recurring structural unit

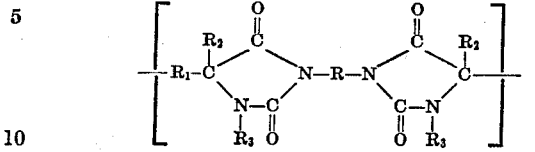

wherein $R_1$ is a polyfunctional alkyl, cycloalkyl, alkoxyalkyl or alkylthioalkyl radical, an aralkyl radical or an aryl radical, $R_2$ is a hydrogen atom or an alkyl group, $R_3$ is a hydrogen atom or an alkyl, aralkyl or aryl group and R is a divalent aliphatic, cycloaliphatic or aromatic radical.

2. A polymer according to claim 1 having the recurring structural unit

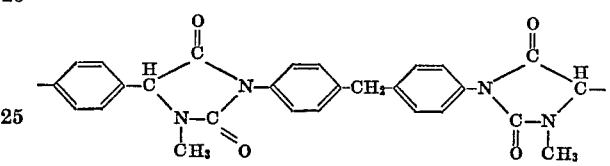

3. A polymer according to claim 1 having the recurring structural unit

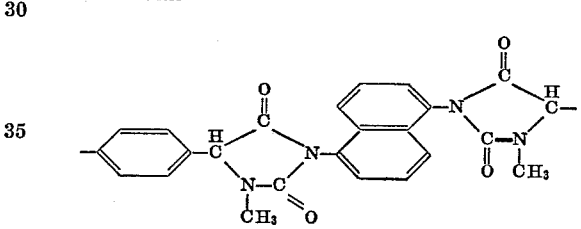

4. A polymer according to claim 1 having the recurring structural unit

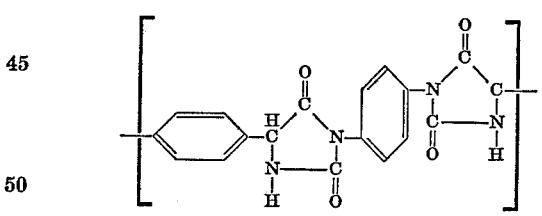

5. Blend of the polymer of claim 1 and a polyurethane.

6. Process for producing a heat resistant polymer which comprises reacting a glycine compound of the formula

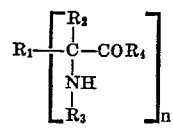

in which $R_1$ denotes an n-functional alkyl-, cycloalkyl-, alkoxyalkyl or alkylthioalkyl radical or an aralkyl or aryl radical, in which radicals there are at least three atoms in between any two links to the central C atom, $R_2$ denotes a hydrogen atom or an alkyl radical, $R_3$ denotes a hydrogen atom or an alkyl, aralkyl or aryl radical, $R_4$ denotes a hydroxyl, amino, alkylamino, dialkylamino, alkoxy or aroxy group and $n$ is an integer from 2 to 4, with a polyisocyanate or a polythioisocyanate at a temperature of about 80 to 500° C.

7. Process according to claim 6 wherein said polymerizing is carried out in an inert organic solvent.

8. Process according to claim 6 wherein said polyisocyanate is an isocyanate of the formula $$(CH_2)_n—(NCO)_2$$

$n$ being 4 to 8.

9. Process according to claim 6 wherein said isocyanate is an aromatic diisocyanate.

10. Process according to claim 6 wherein said isocyanate is a masked polyisocyanate.

11. Process according to claim 6 wherein the isocyanate is used in quantities of 0.5 to 10 mols per mol of NH groups of the glycine compound.

12. Process according to claim 6 wherein said polymerizing is carried out in the additional presence of a metal alcoholate or tertiary amine as a catalyst.

13. Process according to claim 6 wherein said polymerizing is carried out in the additional presence of a hydroxyl group containing polyester to form a copolymer.

References Cited

UNITED STATES PATENTS

| | | | |
|---|---|---|---|
| 3,296,208 | 1/1968 | Regens | 260—309.5 |
| 3,397,253 | 8/1968 | Merten et al. | 260—858 |

OTHER REFERENCES

Chemical Abstracts, vol. 57, 11,366 (1962).

Y. Shimodei, Kogyo Kagaho Taschi 65, pp. 515–519 (1962).

SAMUEL H. BLECH, *Primary Examiner.*

P. LIEBERMAN, *Assistant Examiner.*

U.S. Cl. X.R.

260—77.5, 309.5, 857, 860, 897